United States Patent [19]

Morikawa et al.

[11] Patent Number: 4,902,524
[45] Date of Patent: Feb. 20, 1990

[54] METHOD FOR CONTINUOUSLY PRODUCING AT A SUBSTANTIALLY CONSTANT FLOW RATE A STRIP OF DOUGH OF SUBSTANTIALLY UNIFORM DIMENSIONS

[75] Inventors: Michio Morikawa; Torahiko Hayashi, both of Utsunomiya, Japan

[73] Assignee: Rheon Automatic Machinery Co., Ltd., Tokyo, Japan

[21] Appl. No.: 295,189

[22] Filed: Jan. 9, 1989

Related U.S. Application Data

[62] Division of Ser. No. 175,103, Mar. 30, 1988.

[30] Foreign Application Priority Data

Apr. 1, 1987 [JP] Japan .................... 62-80290

[51] Int. Cl.$^4$ .......................... A21D 6/00; A23P 1/10
[52] U.S. Cl. .................... 426/503; 426/518; 426/496; 426/502; 425/140; 425/238
[58] Field of Search ............ 426/502, 503, 518, 496; 425/140, 141, 145, 148, 238, 241, 363, 383, 397

[56] References Cited
U.S. PATENT DOCUMENTS 4,276,317  6/1981  Hayashi ................. 426/502
4,631,021 12/1986  Hayashi ................. 425/140

Primary Examiner—Donald E. Czaja
Assistant Examiner—H. Pratt
Attorney, Agent, or Firm—Guy W. Shoup; Gideon Gimlan

[57] ABSTRACT

A method for continuously producing a dough strip of substantially uniform dimensions is disclosed. The method is carried out in an apparatus (2) comprising a hopper (4) having a divider (8) at its bottom, a conveyor (10) with a weighing device (12), a transfer conveyor (13), a thickness defining device (24) mounted on the transfer conveyor (13) and width defining members (26) between the transfer conveyor (13) and the thickness defining device (24). Dough portions supplied from the hopper (4) are weighed and supplied onto the transfer conveyor (13) one after another. By regulating the width and thickness of each dough portion, the length of the dough portion is made proportional to its weight. A new dough portion is supplied onto the transfer conveyor when the conveyor has conveyed the preceding dough portion a distance proportional to the weight thereof. Successive dough portions are connected to each other to make a continuous dough strip when they pass through the thickness defining device (24) and the width defining members (26).

1 Claim, 3 Drawing Sheets

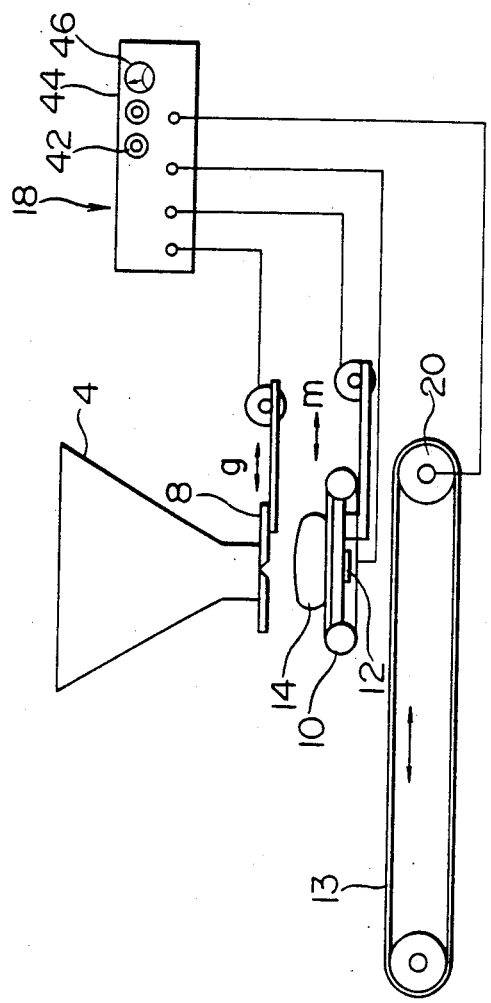

METHOD FOR CONTINUOUSLY PRODUCING AT A SUBSTANTIALLY CONSTANT FLOW RATE A STRIP OF DOUGH OF SUBSTANTIALLY UNIFORM DIMENSIONS

This application is a division of application Ser. No. 07/175,103, filed Mar. 30, 1988.

BACKGROUND OF THE INVENTION

1. Field of the Invention

This invention relates to an apparatus and method for continuously producing at a substantially constant flow rate a strip of dough of substantially uniform dimensions, which apparatus and method is used for producing bread or confectionery.

2. Prior Art

Conventionally, automated dough stretching machines and other types of dough processing machines receive a strip of dough fed from the hopper on conveyors. The dimensions of such a dough strip are not regulated before it enters the machines.

U.S. Pat. No. 4,192,636 discloses an apparatus for continuously stretching dough for cakes, bread and the like, comprising a roller mechanism having a plurality of rollers progressing along a closed envelope including a straight portion, and a plurality of conveyor belts arranged in series and disposed under the rollers. The conveying path of the conveyors is spaced apart from the straight portion of the roller mechanism. In this apparatus, dough is supplied directly from the hopper to an upstream conveyor and is conveyed into the space between the roller mechanism and the conveying path of the conveyors. Since the conveyors are driven so that each conveyor moves faster than the nearest upstream conveyor, the dough is stretched by the difference of the speeds of the conveyors, while being held down by the rollers.

However, since the dough readily stops at the exit port of the hopper, it is difficult to supply the dough at a substantially constant flow rate. Further, since the dimensions of the dough are not regulated before it is conveyed into the space between the roller mechanism and the conveyors, the dough is subjected to excessive pressure. This causes a turbulent flow to be generated in it when it enters the space, if part of the dough supplied to the stretching apparatus is too thick. In the case of bread dough, especially, its gluten structure tends to be destroyed due to the pressure. In contrast, if part of the dough supplied is too thin, the straight portion of the roller mechanism cannot hold the dough, and thus the apparatus cannot stretch the dough. Thus, it has been required that a dough strip of uniform dimensions suitable for the apparatus be continuously supplied to it at a substantially constant flow rate.

The same situation arises in other types of dough processing machines, such as flow-rate regulating machines and multiple-layer forming machines if dough from the hopper is directly supplied to these machines on conveyors.

SUMMARY OF THE INVENTION

An object of this invention is to provide an apparatus and method for continuously producing at a substantially constant flow rate a strip of dough of substantially uniform dimensions.

Another object of this invention is to provide an apparatus for continuously producing at a substantially constant flow rate a strip of dough of substantially uniform dimensions in which dough is not subjected to excessive pressure when it is processed.

According to one aspect of this invention, an apparatus for continuously producing, at a substantially constant flow rate, a strip of dough of substantially uniform dimensions, is provided, comprising (a) a hopper for dough, (b) divider means provided downstream of said hopper for dividing said dough into portions.

(c) weighing and supplying means disposed adjacent said divider means for weighing each of said dough portions and supplying said dough portions.

(d) conveyor means for successively receiving said portions from said supplying means and conveying said dough portions, and provided with a path for said dough portions thereon.

(e) control means for providing a signal to the weighing means, when said conveyor means has conveyed a dough portion a distance proportional to the weight of said dough portion, to cause said weighing means to supply a subsequent dough portion to the area where dough portions are received on the conveyor means, (f) pressing means disposed above said path downstream of said area and spaced apart from said path so as to cause said dough portions to have a determined thickness, and (g) a pair of width defining members positioned, one on each side of said path, between said pressing means and said path, for constricting said dough portions to have a predetermined width.

According to another aspect of this invention, a method for continuously producing, at a substantially constant flow rate, a strip of dough of substantially uniform dimensions, is provided, comprising (a) dividing a dough mass into portions, (b) weighing each of said dough portions, (c) placing said dough portions serially on a feed conveyor so as to cause each of said dough portions to occupy a space proportional to the weight of each said dough portion, and (d) regulating the width and thickness of each said portion to form said dough portions into a continuous dough strip of uniform dimensions.

In this apparatus, a portion of the dough contained in the hopper is supplied to the weighing and supplying means where the weight of the dough portion is measured. Since the thickness and width of the dough portion is regulated so as to take given values by the pressing means and the pair of defining means, the length of the dough becomes proportional to the weight of the dough portion, assuming that the dough portion took the form of a rectangular parallelepiped. Thus the weighing and supplying means supply one of the dough portions in response to a signal from the control unit when the conveyor means has conveyed its preceding dough portion a distance proportional to the weight of the preceding dough portion. When the width and thickness of the dough portions are defined to have predetermined values, the upstream end portion of the preceding dough portion, and the downstream end portion of the subsequent dough portion, come in contact with each other to form a dough strip. Therefore, a dough strip of substantially uniform dimensions is produced at a substantially constant flow rate.

BRIEF DESCRIPTION OF THE DRAWINGS

FIG. 3 shows the control unit of the apparatus.

EMBODIMENTS

Figure 1:
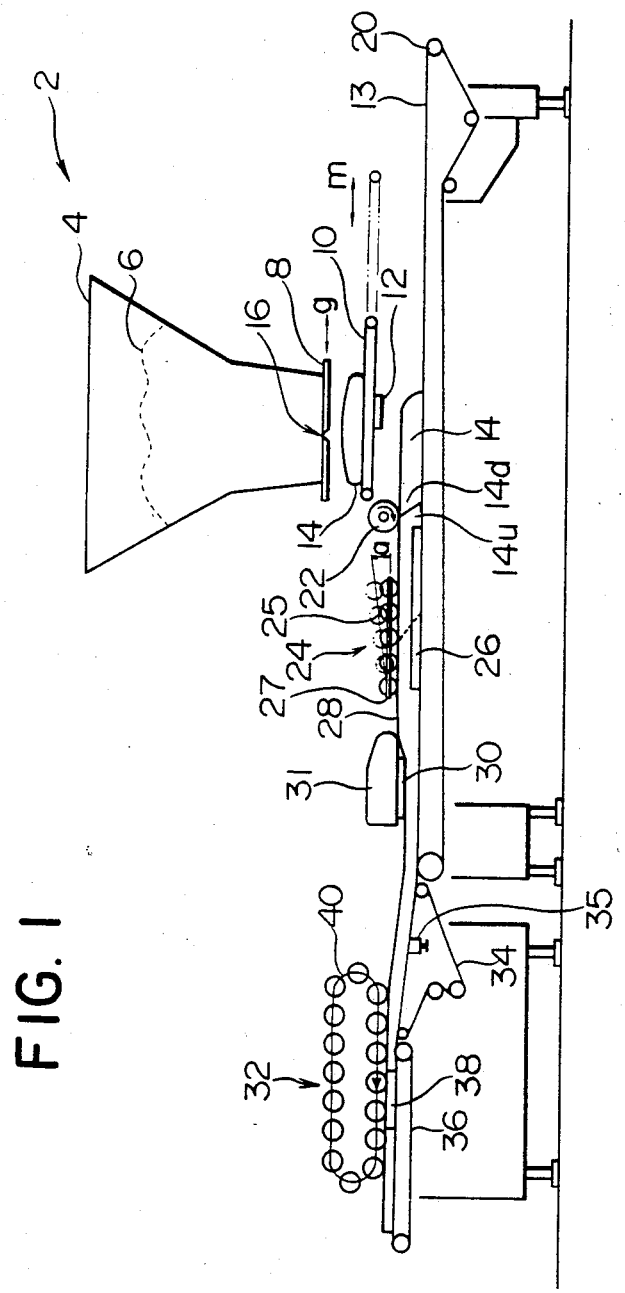
FIG. 1 shows the apparatus for producing a dough strip of uniform dimensions of a preferred embodiment of this invention, and a quantifying apparatus.

In FIGS. and 1 and 2 the apparatus (2) comprises a hopper (4) for containing and feeding dough (6) having a divider (8) at its bottom, and a weighing and supplying conveyor (10) having a weighing device (12) for measuring the weight of the dough portion (14) divided and supplied from the hopper (4), and a feed conveyor (13) disposed underneath the weighing and supplying conveyor (10) for transferring the dough portions (14) received from the weighing and supplying conveyor (10).

The divider (8) has a conventional structure and, in this embodiment, a pair of cutter blades disposed at the bottom of the hopper (4) and arranged to horizontally move, as indicated by arrows g in FIGS. 1 and 3, to close and open an exit port (16) of the hopper. When the exit port is open, a portion of dough progresses onto the weighing and supplying conveyor (10) which are positioned directly underneath the exit port (16). When the exit port (16) is closed, a certain amount of a dough portion is divided by the cutter blades and placed on the conveying surface of the weighing and supply conveyor (10).

By this cutter structure it is possible to minimize any harm that would be caused to dough if other types of conventional dividers, such as a rotary valve and piston cylinder assembly. In such a conventional divider, a recess in the valve receives dough and then the valve rotates to the position where the recess communicates with the piston cylinder at an end and an exit port at the other end so that dough in the recess is extruded by the piston from the exit port. Such a divider tends to harm the gluten tissue of the dough while it is being subjected to the severing action of the valve and the pressure from the piston.

The dough portion (14) on the weighing and supplying conveyor (10) is weighed by the weighing device (12) of a conventional structure. As will be discussed in more detailed below, the weight of the dough portion (14) is stored in a memory of a control unit (18) shown in FIG. 3.

The weighing and supplying conveyor (10) is positioned underneath the exit port (16) of the hopper (4) and reciprocally and horizontally moves as indicated by arrows m in FIGS. 1 and 3. The conveyor (10) is a belt conveyor driven intermittently. Its belt is not driven when it receives a dough portion (14). After it receives a dough portion it moves rearwardly, that is, in the upstream direction of the apparatus (2), while its belt starts to be driven forwardly. Since the weighing and supplying conveyor (10) moves rearwardly at the same speed as the driven speed of the belt, the dough portion (14) drops onto the area of the transfer conveyor (13) directly underneath the position where the dough portion (14) is placed on the weighing and supplying conveyor (10).

The transfer conveyor (13) comprises as encoder (20) in its upstream end driven roller. The encoder (20) has a conventional structure and, in this embodiment, comprise a counter that senses and counts the number of marks provided on the endless belt at a selected interval so that the travel distance of a point on the belt can be readily calculated.

Above the conveyor path of the transfer conveyor (13), and downstream of the area to which the dough portion (14) is supplied, a single roller (22) is placed.

The single roller (22) is rotatable about its axis, which axis is positioned transverse to the direction of the movement of the dough portion (14) on the transfer conveyor (13). Downstream of the single roller (22), a thickness defining device (24) and width defining members (26) are mounted on the transfer conveyor (13). The single roller (22) functions as a preliminary thickness defining device. That is, the roller presses the dough portion (14) to make its thickness more uniform so that the dough portion (14) can be more readily handled by the thickness defining device (24).

The thickness defining device (24) comprises a plurality of rollers (25). These rollers (25) are horizontally positioned in series and parallel to each other, transverse to the direction of the movement of the dough portion (14), and spaced apart from the conveyor by a distance equal to the desired thickness of the dough. They are held together by a pair of arms (27) on both sides of the rollers by attaching the shafts of each roller to the arms.

The rollers in the upstream portion of this device are driven faster than the conveying speed of the transfer conveyor (13) and the rollers downstream are driven in the same speed as the conveying speed of the transfer conveyor (13). The downstream end of each arm (27) is pivotally connected to each of the joints (not shown) mounted in the frame for the transfer conveyor (13) while the upstream end of each arm is connected to a lifting means (not shown) mounted on the frame of the transfer conveyor (13) so that the arms are lifted or lowered as indicated by the arrows a in FIG. 1. Thus, the connecting arms (27) are pivotally moved about the joints connected to the downstream ends of the connecting arms. Since the upstream ends of the connecting arms (27) are lifted when a dough portion progresses into an area underneath the thickness defining device (24), the dough portion can progress into the area without the upstream rollers interfering with it even if the dough is thicker than the predetermined thickness.

Figure 2:
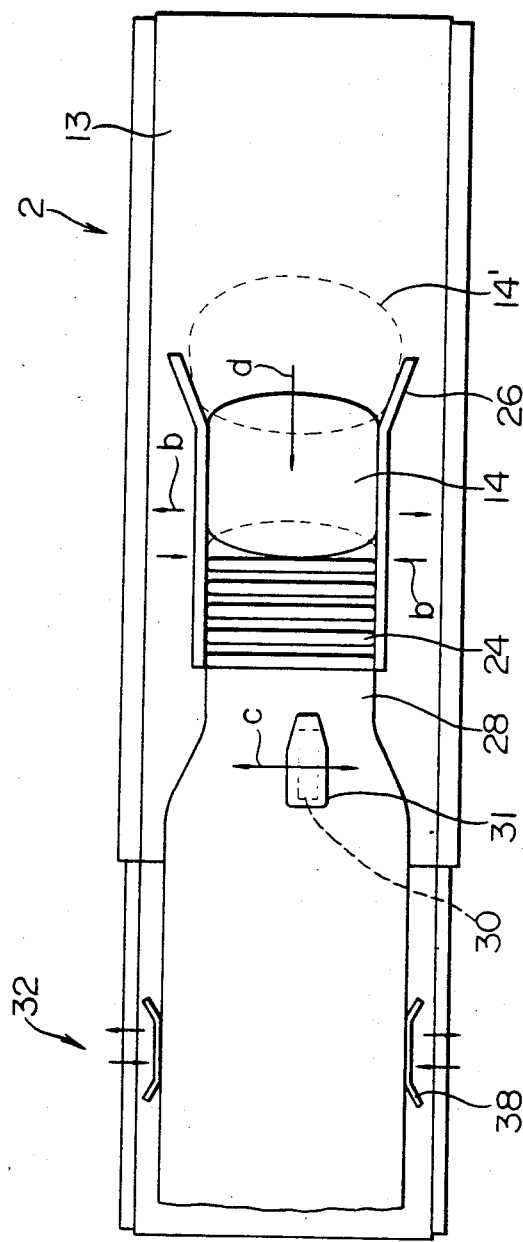
FIG. 2 shows a plan view of the transfer conveyor of the apparatus in which dough portions are formed into a dough strip.

The width defining members (26) are mounted between the thickness defining device (24) and the transfer conveyor (13). As shown in FIG. 2, the width defining members comprise a pair of upright plates, whose downstream ends are spaced apart from each other by a distance equal to the desired width of the dough strip. The upstream ends of the width defining members bend outwardly to provide a wider space between them than their downstream parallel portions. Thus the dough portion (14) can progress into the space between the plates of the width defining members (26) without colliding with the upstream ends of the plates. The plates are connected to a point or the periphery of rotary discs by pins (not shown) so that they are movable in the transverse direction of the transfer conveyor (13) toward and away from each other as indicated by the arrows b in FIG. 2, while they maintain their parallel relationship to each other. Thus the plates push both sides of the dough portion (14) passing therebetween. As a result, the width of the dough portion (14) is regulated so that it becomes equal to a predetermined distance, which is the distance between the plates when they are closest to each other. During the regulation of the dough width, the thickness of the dough portion (14) is also defined by the rollers of the thickness defining device (24) to have a thickness equal to the distance between the lowest part of the most downstream roller (25) of the thickness defining device (24) and the conveying belt of the transfer conveyor (13). While passing under the thickness defining device (24) the downstream end part (14d) of the dough portion si unified with the upstream end part (14u) of its preceding dough portion (14) by pressure imparted by the rollers (25), to produce a dough strip (28) from the dough portions (14).

Further downstream of the thickness defining device (24) and the width defining members (26) a crossing roller (30) is positioned above the transfer conveyor (13). The axis of the crossing roller (30) is positioned in the same direction as that of the progress of the dough, as indicated by the arrow d in FIG. 2. The crossing roller (30) is housed in a case (31), and its front and rear ends are rotatably supported by the end walls of the case. A rail (not shown) is mounted above the transfer conveyor (13) in its transverse direction and acts as a guide for the crossing roller (30) so that the crossing roller (30) is movable in the transverse direction, as indicated by the arrow c in FIG. 2. The crossing roller (30) is freely rotatable about its axis. Thus when the crossing roller (30) is mounted, it stretches the dough strip (28) in the lateral direction to have a wider width.

Downstream of the transfer conveyor (13), the apparatus (32) for quantifying the flow rate of dough is provided. The quantifying apparatus (32) not only quantifies the flow rate but also regulates the dimensions of the dough more precisely. The apparatus (32) comprises a variable-speed dough feed conveyor (34) having a weighing device (35), a constant speed conveyor (35) provided thereon, a width defining device (38), and a roller mechanism (40) disposed over both conveyors (34,36) and having an endless roller path with a straight portion facing the conveyors. The roller mechanism (40) comprises a plurality of rollers freely rotatable about their axis and movable along the endless path. The feed conveyor (34) is positioned downstream of and adjacent the transfer conveyor (13) so that the feed conveyor (34) receives the dough strip (28) from the transfer conveyor (13) and feeds it to the space formed between the roller mechanism (40) and the two conveyors (34, 36). Since the dough strip (28) is thickened or stretched based on the weight of portions of the dough by changing the speed difference of the two conveyors (34, 36), a dough strip of a more precise and uniform thickness and width, suitable for a further process, can be produced.

Since the feed conveyor (34) is controlled to be driven at a speed inversely proportional to the weight of the dough portion measured by the weighing device (35), the transfer conveyor (13) of the apparatus (2) is also controlled to be driven at the same speed as the feed conveyor (35). In this preferred embodiment, the downstream driven roller of the transfer conveyor (13) and the upstream driven roller of the feed conveyor (34) are operatively connected by an endless chain (not shown). The quantifying apparatus (32) is disclosed in U.S. Pat. No. 4,692,107 and is incorporated into this specification by reference.

In FIG. 3 the control unit (18) comprises a memory and an arithmetic circuit. The control unit (18) receives the weight data of the dough portion measured, and the travel distance data from the weighing device (12) and the encoder (20), and sends signals to the driving means for the weighing conveyor (10) and the driving means for the cutter blades of the divider (8) so that their movements can be controlled. Now the function of the control unit will be discussed in detail below by reference to the operation of the apparatus (2) of this invention.

In operation, first, when a proximity switch (not shown) detects that the weighing conveyor (10) has returned to the original position which is directly beneath the hopper (4), the control unit (18) sends a signal to the divider (8) to open the cutter blades so that an exit port of the hopper (4) is open. When the exit port (16) is opened, a portion of the dough contained in the hopper (4) progresses through the exit port and drops onto the weighing and supplying conveyor (10). After a predetermined period the control unit (18) sends a signal to the divider (8) to close the cutter blades. Thus the exit port (16) closes and the dough portion (14) on the weighing and supplying conveyor (10) is cut by the cutter blades and separated from the dough (3) in the hopper (4). Then the weighing device (12) measures the weight of the dough portion (14). As stated above, the weight of the dough portion (14) supplied from the hopper (4) is not precisely regulated in this invention. Thus, the weight of the dough portions (14) may vary.

The weight of the dough portion (14) is stored in the memory of the control unit (18). In this apparatus, the operator inputs information regarding the unit weight of the dough, that is, the weight of dough per unit volume obtained by multiplying the unit length by the predetermined width and by the predetermined thickness and by setting a unit weight dial (42) before the operation starts. The predetermined width and the thickness are a given width and thickness to which the width and thickness of a dough portion (14) are regulated. The unit weight Gu per unit volume can be readily calculated using the specific gravity of the dough material.

In the arithmetic circuit in the control unit (18), the length of each dough portion at a given thickness and a given width is calculated, assuming that the dough portion took the form of a rectangular parallelepiped, based on the unit weight Gu and the weight of the dough portion measured. For example, assuming that the thickness and width are set at 2 cm and 30 cm respectively, and the unit length is set at 1 cm, the unit volume is 60 cm$^3$. When the unit weight Gn of a dough portion of a unit volume 60 cm$^3$ is found to be 60 g, a dough portion of 2400 g should have a length of 40 cm at the same given thickness and width, so long as the dough portion has the same composition and consistency.

Thus, in general, the length L of the dough portion at a given thickness and a given width can be calculated by the following equation:

$$L = Ga/Gu$$

Wherein Ga indicates the total weight of the dough portion and Gu indicates the unit weight of the dough.

Dough portions (14) are supplied to the transfer conveyor (13) one after another to be placed serially on the conveying path of the transfer conveyor (13).

According to this invention, because the dough portion is to have a given width and thickness, the length of the dough portion should be proportional to its weight.

Thus the weighing and supplying conveyor (10) supplies the dough portion to the transfer conveyor (13) when the transfer conveyor (13) has conveyed the preceding dough portion a distance D proportional to the weight of the preceding dough portion.

However, the distance D may take a different value from the calculated length of the dough piston (14). The distance D, a factor in determining the time to supply the dough portion (14), is determined based on the characteristics of the dough portion (14), as will be discussed below.

The calculation of the distance D will be now be discussed, in detail.

If the distance D is chosen so that it becomes equal to the calculated length of the dough portion (14) at its given thickness and width, the upstream end portion (14u) of the preceding dough portion, and the downstream end portion (14d) of the subsequent dough portion, will contact each other, especially when the preceding and subsequent dough portions have passed the thickness defining device (24) and the width defining members (26).

In this preferred embodiment, the distance is chosen to be shorter than the calculated length of the dough portion (14) so that the downstream end portion (14d) of the subsequent dough portion is ensured to always overlap the upstream end portion (14u) of the preceding dough portion when the subsequent dough portion is placed on the transfer conveyor (13), as shown in FIG. 1.

When the dough portion has high elasticity it is difficult to stretch and be unified with the adjacent dough portions. The end part of such a dough portion sometimes fails to contact the end part of the preceding dough when placed on the transfer conveyor (13). Further, if the dough portion is thick, its downstream end part may be far removed from the upstream end part of the preceding dough portion before its width and thickness are regulated. Therefore, by placing the dough portions on the transfer conveyor (13) so that they overlap one another on their end portions, it is ensured that they will become contiguous with each other after they pass through the thickness defining device (24). Naturally, the increase in the volume of the overlapping portion increases the width and thickness. Thus the space between the rollers (25) of the thickness defining device (24) and the conveying path of the transfer conveyor or the distance between the two width defining means should be adjusted.

To provide such overlapping end portions (14d, 14u) at a predetermined ratio, to the full length of the dough portion (14), the relation between the distance D, which is the distance proportional to the weights of the preceding dough portion, as discussed above, and the calculated length L of the dough portion, should be indicated as follows:

$$D/L = X \; (X < 1) \quad (2)$$

From this, the following equation can be derived:

$$D = LX \quad (3)$$

When the value of X is properly chosen based on characteristics of the dough material such as viscosity or elasticity, the downstream end part of a dough portion always overlaps the upstream end part of the preceding dough portion. In this preferred embodiment the operator can set the value X by setting the dial (44 in FIG. 3), and the value X is stored in the memory of the control unit (18). The value is also indicated on an indicator (46).

Based on the distance calculated by the arithmetic circuit in the control unit, a signal is given the weight conveyor (10) to cause it to supply the dough portion (14) on the area directly underneath the exit port (16) of the hopper (4). In this preferred embodiment, the encoder (20) counts the marks on the conveyor belt to measure the travel distance of the transfer conveyor (13) and sends the signal to the weighing conveyor (10).

In response to the signal from the encoder (20), the conveying belt of the weighing conveyor (10) is driven while its frame starts to move back as indicated by the arrow m is FIGS. 1 and 3.

When the weighing conveyor (10) finishes supplying the dough portion to the transfer conveyor (13), the weighing device (12) detects the absence of any weight and sends a zero signal to the control unit (18). The control unit (18) then sends a signal to have the weighing and supplying conveyor (10) return to its original position for receiving the subsequent dough mass from the hopper (4).

As discussed before, the downstream end part (14d) of the dough portion (14) on the transfer conveyor (13) overlaps the upstream end part (14u) of its preceding dough portion as shown in FIG. 2. A third dough portion entering the space between the two width defining members (26) is shown in FIG. 2 by a dotted line.

The dough portion (14) on the transfer conveyor (13) is first stretched by the single roller (22). However, since in most cases material such as dough has a specific determined thickness based on its form-retention characteristics when it is placed on a flat surface, the single roller (22) can be eliminated unless the thickness is too great for the dough portion to pass under the rollers of the thickness defining device (24).

The dough portion (14) is then transferred to a space between the plates of the width defining members (26) and under the thickness defining device (24). In this preferred embodiment the rollers of the thickness defining device (14) are constructed so that the upstream rollers are driven at a speed faster than the conveying speed of the transfer conveyor (13) and the downstream rollers are driven at the same speed as that of the transfer conveyor (13). Since the upstream rollers are driven faster than the progress of the dough portions, the travel speed of the upper surface of the dough portion (14) progressing under such rollers is faster than that of its lower surface. Thus, the interface between the preceding dough portion and the subsequent dough portion (indicated by a dotted line in FIG. 1) becomes forwardly inclined so that the upper part of the downstream end of the subsequent dough portion sides on the lower part of the trailing end of the preceding dough portion, and the overdropping area increases as shown in FIG. 1. Thus, even if the distance D is set at a value that is equal to the calculated length, such a construction of the rollers ensures that the end parts (14u, 14d) of the dough portions firmly contact each other. The rollers also press the dough portions to cause them to have a predetermined thickness. Due to the pressure applied, the overlapping parts (14d, 14u) of the dough portions become unified. The dough portions are also pressed on both sides by the plates of the width defining members (26). Accordingly the dough portion is regulated to have a predetermined width. As a result, a dough strip

(28) of a predetermined width and thickness is provided when the dough portions pass the thickness defining device (24) and the width defining device (26).

The dough strip (28) is then stretched by the crossing roller (30) before the dough strip (28) is fed to the quantifying apparatus (32). The crossing roller (30) further stretches the dough strip to have a wider width as shown in FIG. 2.

The dough strip (28) thus treated can be supplied to stretching or other processing apparatuses for further processes. In this embodiment, the dough strip is supplied to the quantifying apparatus (2). In the apparatus (2) the dough strip (28) is made completely uniform with more precisely regulated processing steps.

According to this invention, dough portions supplied from the hopper are unified into a continuous dough strip. The width and thickness of the dough strip are precisely regulated, and thus a dough strip of substantially uniform dimensions is produced at a substantially constant flow rate. The dimensions of the dough are chosen to accommodate the throughout the apparatuses for further processing, such as a stretching apparatus, and so the apparatuses can effectively process the dough.

In this invention there is no possibility that excessive pressure can be imparted to the dough while it is processed. Therefore, the gluten structure of the dough is not harmed. Thus, a dough strip of good quality can be provided.

We claim:

1. A method of continuously producing, at a substantially constant flow rate, a strip of dough of substantially uniform dimensions, comprising:

dividing a dough mass into portions;

weighing each of said dough portions;

placing said weighted dough portions serially on a feed conveyor so as to cause each of said weighed dough portions to occupy a space substantially proportional to the weight of each said weighed dough portion, each weighed dough portion having a downstream edge and an upstream edge, and each said space being calculated such that each said upstream edge contacts each succeeding downstream edge, and regulating the width and thickness of each said weighed dough portion such that each said weighed dough portion is stretched to substantially cover its respective calculated space, thereby bringing into contact each upstream edge with each successive downstream edge to form said dough portions into a continuous dough strip of uniform dimensions.

* * * * *